(12) United States Patent
Bouwers

(10) Patent No.: US 7,546,964 B2
(45) Date of Patent: Jun. 16, 2009

(54) BRUSH CHIPPER WITH IMPROVED FEED ROLLERS

(75) Inventor: John T. B. Bouwers, Pella, IA (US)

(73) Assignee: Vermeer Manufacturing Co., Pella, IA (US)

( * ) Notice: Subject to any disclaimer, the term of this patent is extended or adjusted under 35 U.S.C. 154(b) by 94 days.

(21) Appl. No.: 11/744,300

(22) Filed: May 4, 2007

(65) Prior Publication Data

US 2008/0272215 A1    Nov. 6, 2008

(51) Int. Cl.
*B02C 19/00*    (2006.01)
(52) U.S. Cl. .......................... 241/28; 241/92; 144/248.7
(58) Field of Classification Search .............. 144/248.7, 144/248.2, 248.6; 241/281, 92, 28
See application file for complete search history.

(56) References Cited

U.S. PATENT DOCUMENTS 3,661,333 A  * 5/1972 Smith .......................... 241/281
3,861,602 A    1/1975 Smith
4,344,470 A  * 8/1982 Dubey ........................ 144/24.13
5,088,532 A    2/1992 Eggers
5,692,548 A   12/1997 Bouwers
5,692,549 A   12/1997 Eggers
6,027,055 A    2/2000 Doskocil
7,011,258 B2   3/2006 O'Halloran
7,040,558 B2   5/2006 Stelter
7,044,409 B2   5/2006 Stelter

* cited by examiner

*Primary Examiner*—Mark Rosenbaum
(74) *Attorney, Agent, or Firm*—Sturm & Fix LLP

(57) ABSTRACT

An improved feed roller assembly wherein the feed roller provides a force perpendicular to the feed direction of the brush material. In a first embodiment, cleats that are not parallel to an axis of rotation of the feed roller are affixed to a periphery of the feed roller. When the feed roller is oriented with its axis of rotation in a substantially vertical position, each cleat is arranged with its upper end ahead of its lower end, in a direction of rotation. This configuration provides a downward force on the logs or brush being fed into the chipper, thereby reducing the occurrence of bucking. In an additional embodiment, the axes of rotation of the feed rollers lean toward the outfeed end of the brush chipper.

5 Claims, 8 Drawing Sheets

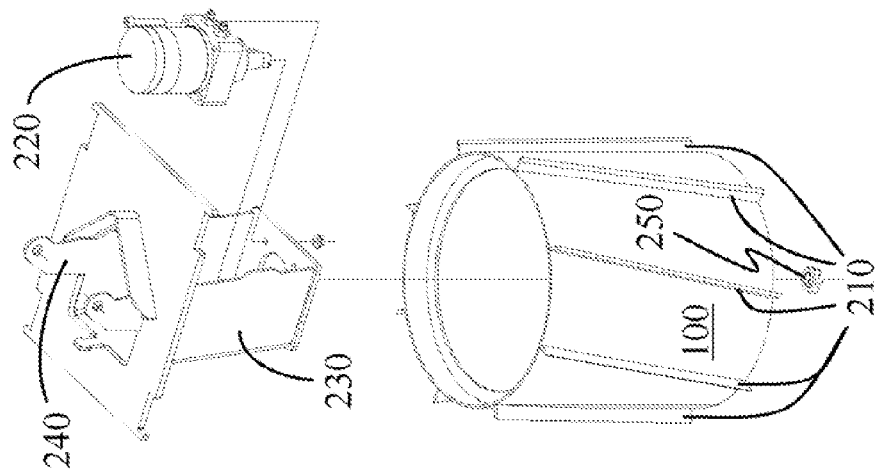
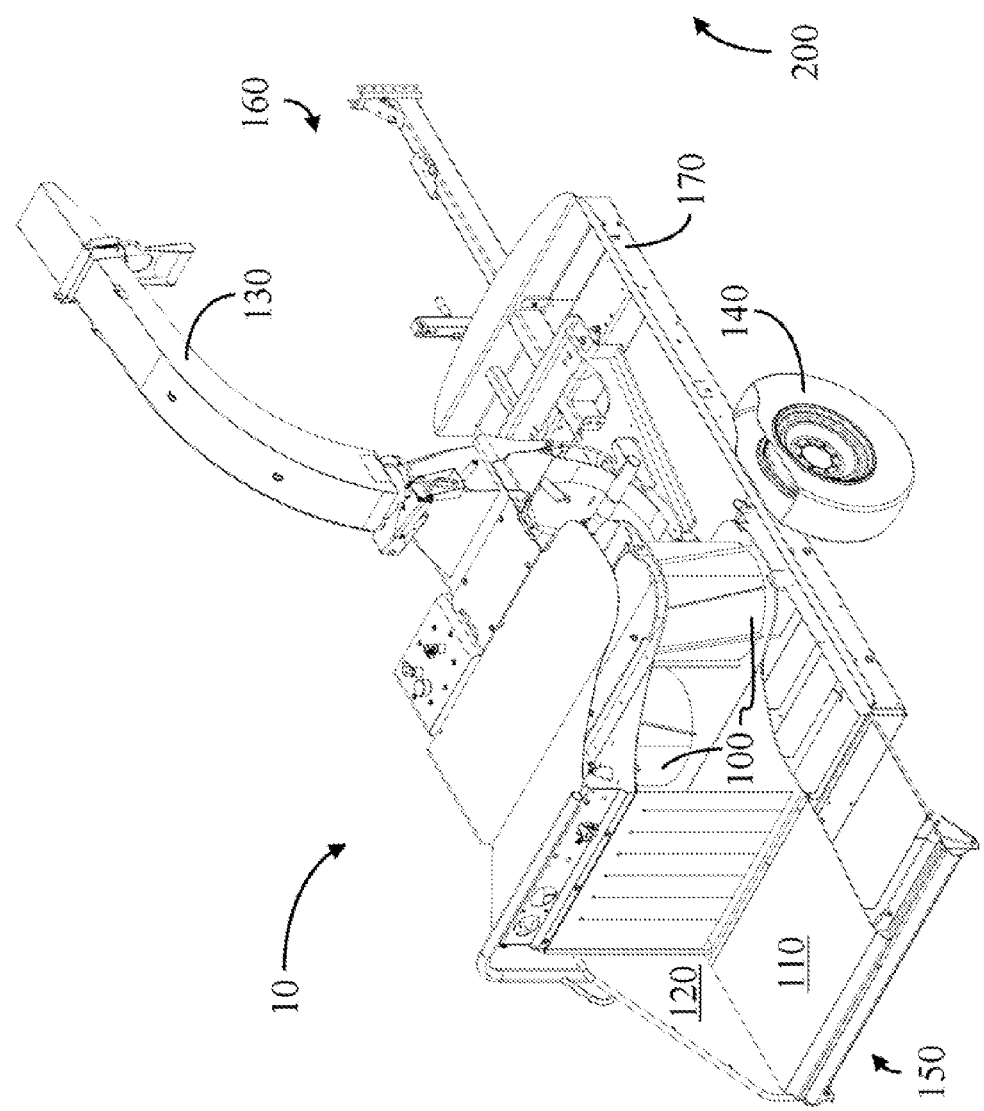
Fig. 2
Fig. 1

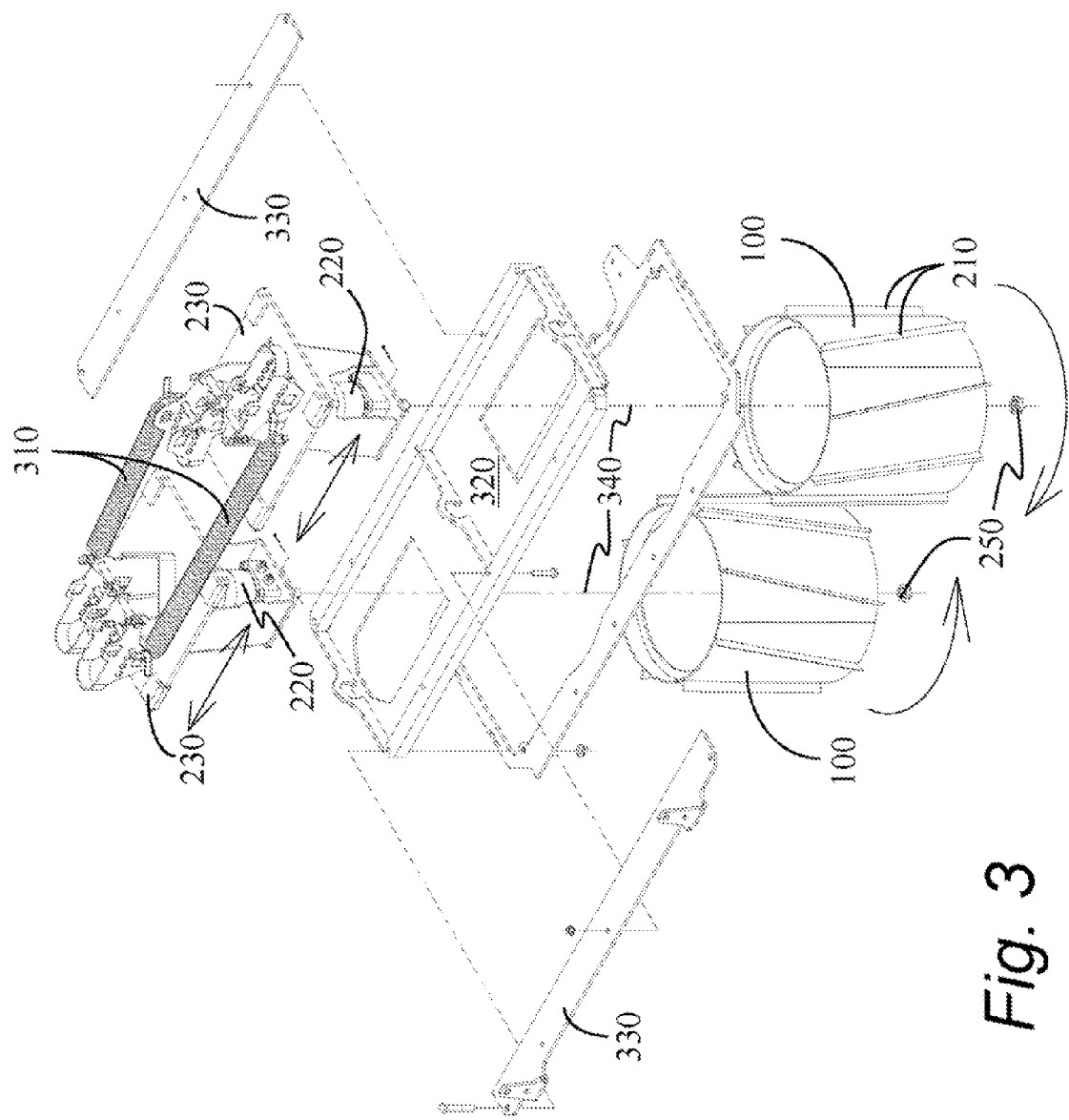

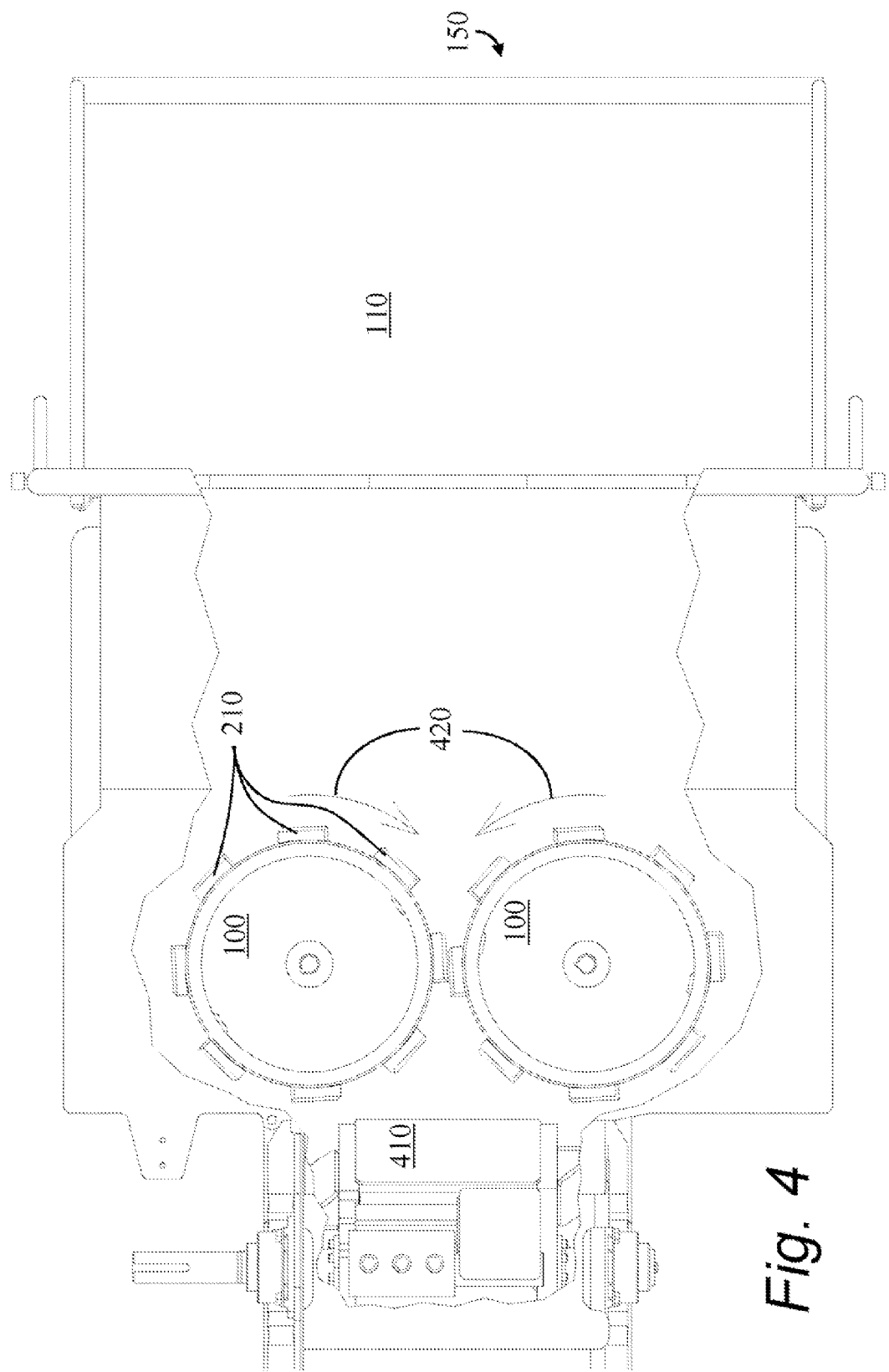

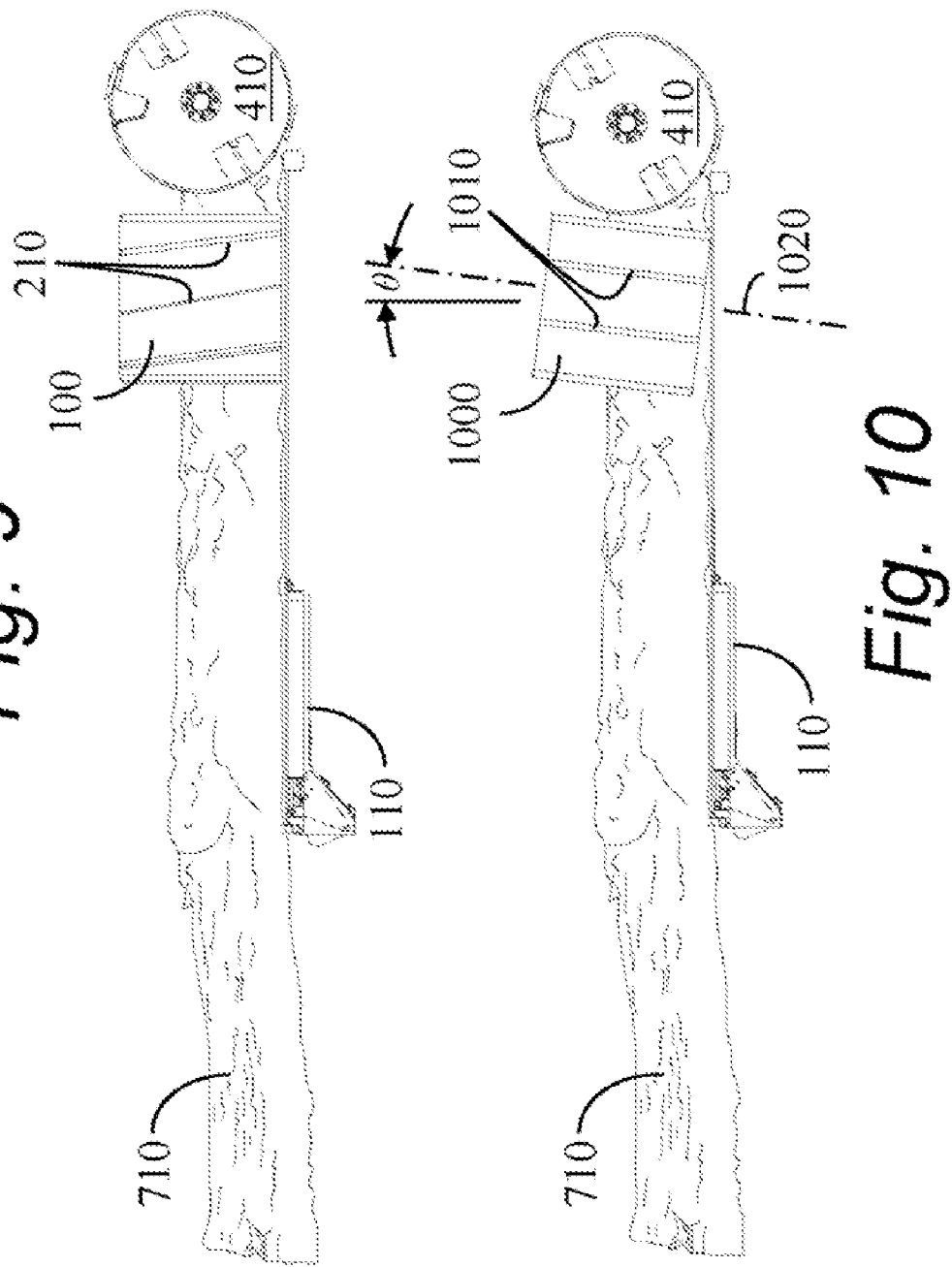

BRUSH CHIPPER WITH IMPROVED FEED ROLLERS

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates generally to a brush chipper. More particularly the present invention relates to an improved feed roller system for feeding brush into the brush chipper.

2. Background Art

Chippers for trees, brush and other woody material, herein referred to collectively as "brush chippers," having a pair of feed rollers for feeding the wood or brush into the chipper mechanism are well known. One such device is described in U.S. Pat. No. 5,088,532, which is hereby incorporated in its entirety by reference. As clearly shown in FIG. 3 of U.S. Pat. No. 5,088,532, a plurality of straight cleats is included around the periphery on the feed rollers for engaging the brush being fed into the chipper.

In U.S. Pat. No. 5,692,549, which is hereby incorporated in its entirety by reference, feed rollers are disclosed for a chipper. Straight, axially extending ribs, or cleats, are disclosed as being provided to engage wood material to grip the wood material and advance it toward the drum. Similarly, U.S. Pat. No. 5,692,548 by Bouwers et al. is hereby incorporated in its entirety by reference.

Brush chippers of the prior art have been provided a disk-type cutter or chipper, as disclosed in U.S. Pat. No. 5,088,532, or a drum-type chipper as disclosed in U.S. Pat. No. 5,692,549.

Various methods for controlling the feed rollers are disclosed in U.S. Pat. Nos. 7,011,258, 7,040,558, and 7,044,409, each hereby incorporated in their entirety by reference.

It has been the experience of operators of brush chippers, that movement of limbs or logs being fed into the chipper can cause bucking by either the limb/log or the chipping machine. This bucking is more pronounced in longer material extended over the feed table. The straight cleats or ribs of the prior art have not provided remedy for the observed bucking.

There is, therefore, a need for improved brush feed rollers provided on brush chippers to reduce the chance of bucking as long material is fed into the chipper.

BRIEF SUMMARY OF THE INVENTION

An object of the present invention is to provide a feed roller configuration for a brush chipper to reduce the occurrence of bucking as long material is fed into the brush chipper. To effect this object, in one embodiment, feed rollers are oriented with their axes of rotation in a substantially vertical direction. Cleats are provided around the periphery of the feed roller that are not parallel to the axis of rotation of the feed roller to which the cleats are attached. Rather, the top end of each cleat is oriented toward the direction of rotation relative to the lower end of said cleat. Hence, as the cleat engages the wood material and travels toward the chipper drum or disk, the top end of the cleat is closer to the chipper drum or disk than the lower end. The result is: the wood material is forced downward, toward the infeed table by the feed rollers. Experience has shown this reduces the chance of bucking.

In a further embodiment, the feed roller may be oriented with its axis of rotation in a substantially horizontal configuration. Here, the cleats would be arranged again in a spiral manner, such as to force the wood material into the chipper disk or drum to reduce the occurrence of bucking.

In another embodiment of the present invention, the axes of rotation of the feed rollers are angled relative to a plane perpendicular to the feed direction of the brush into the chipper. In particular, the axes of rotation may reside in a vertical plane that is parallel to the feed direction, and also lean toward the outfeed end of the brush chipper.

Other objects, advantages and novel features of the present invention will become apparent from the following detailed description of the invention when considered in conjunction with the accompanying drawings.

BRIEF DESCRIPTION OF THE DRAWINGS

FIG. 1 is a perspective view of a brush chipper with some housing cut away to show details of the feed rollers;

FIG. 2 is a perspective view of a feed roller assembly;

FIG. 3 is a perspective view of a pair of feed rollers with their associated assembly;

FIG. 4 is a plan view of the pair of feed rollers;

FIG. 9 is a side elevation detail of the brush chipper with a log;

FIG. 10 is a side elevation detail of the brush chipper showing an alternative embodiment.

DETAILED DESCRIPTION OF THE INVENTION

Figure 7:
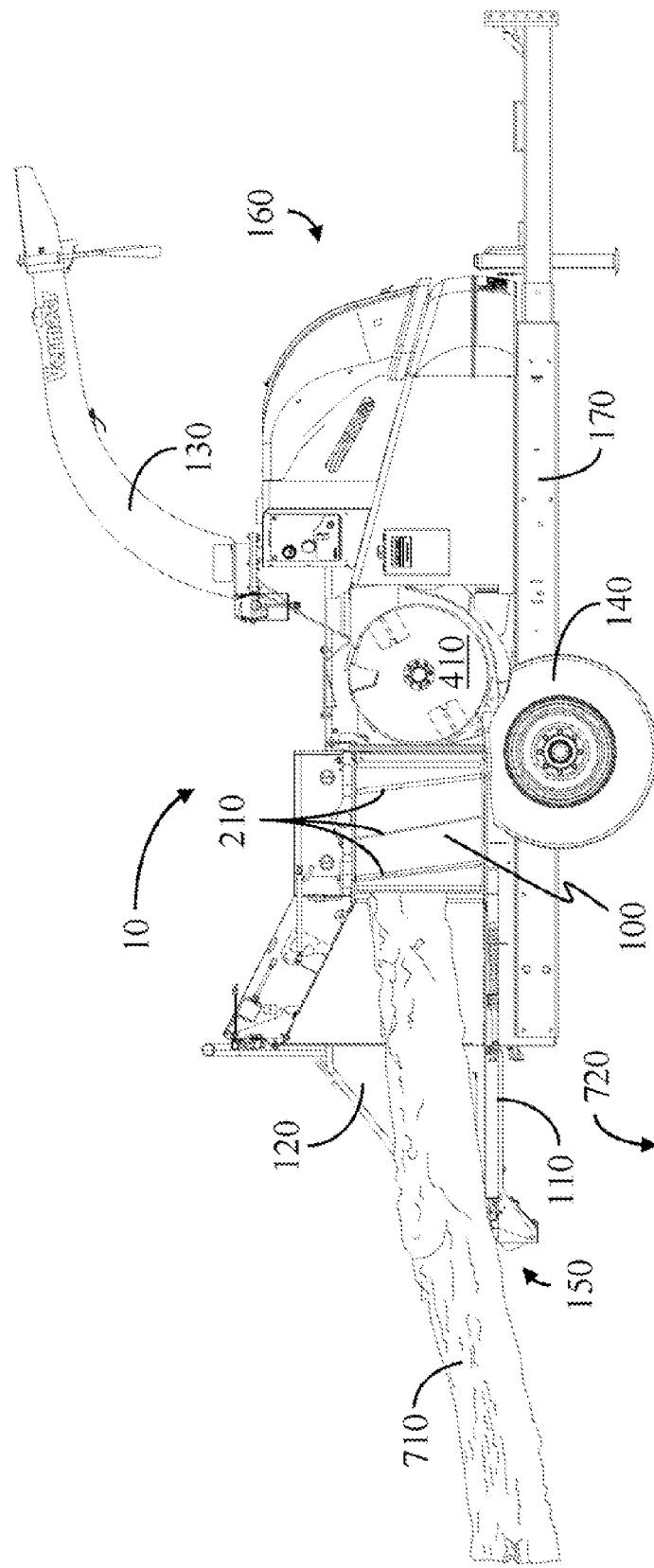
FIG. 7 is a side elevation view of the brush chipper assembly with a log being fed into the chipper.
Figure 8:
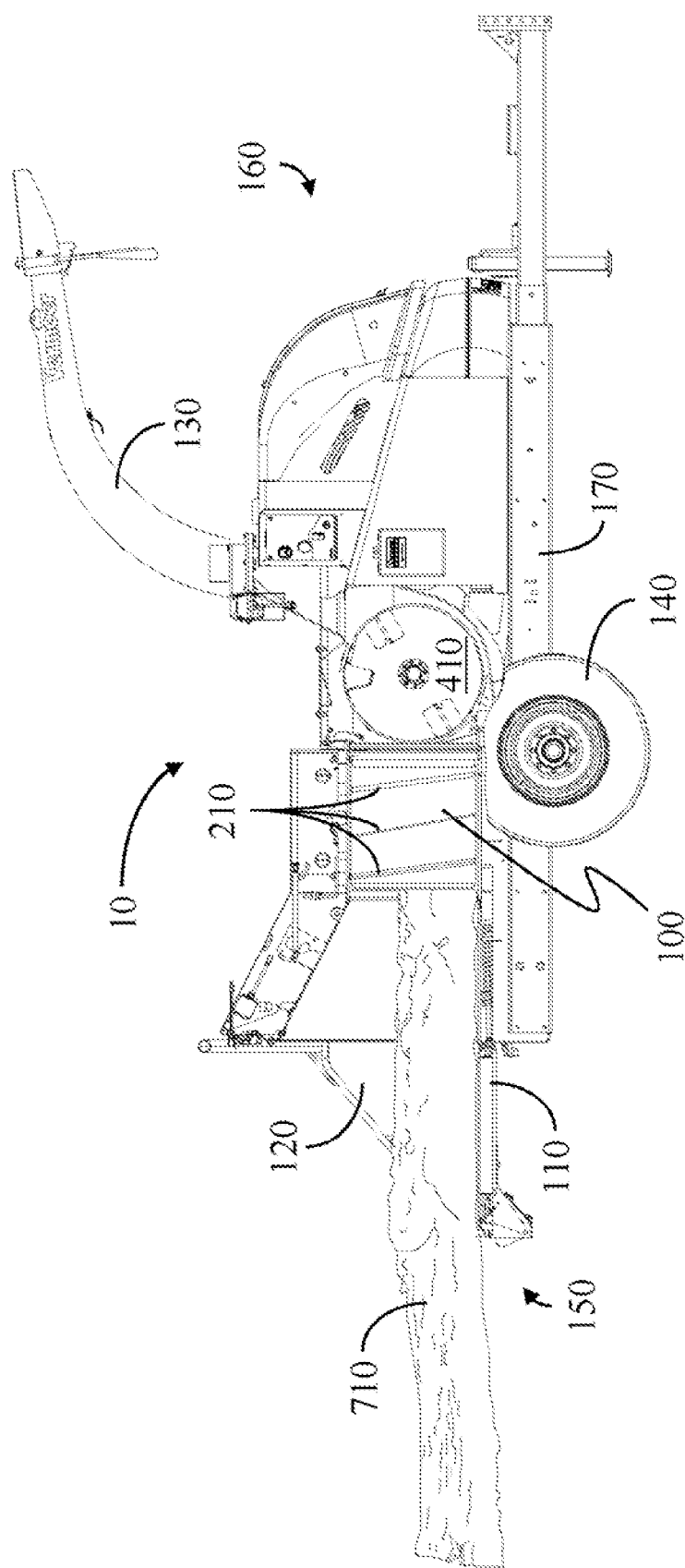
FIG. 8 is a side elevation view of the brush chipper assembly depicting how a forward end of a long log may elevate, resulting in bucking.

Refer now to the drawings wherein like reference numerals designate identical or corresponding parts throughout the several views. A brush chipper 10, illustrated with two feed rollers 100 of the present invention, is shown in FIGS. 1, 7, and 8. Besides the two feed rollers 100, the brush chipper comprises a feed table 110 having perpendicular sides 120 (only one shown) for structural support and for guiding logs 710 (see FIG. 7) or brush into the brush chipper 10.

Once the woody material 710 has been chipped into wood chips, the resulting wood chips are expelled through a rotatable chute 130.

The brush chipper 10 is often mounted on a frame 170 to which wheels 140 (only one shown) are operatively attached, as shown, however, tracks and skids may also be used, and the brush chipper 10 may be stationary as well. The present invention is not limited to any particular conveyance apparatus, nor does it require the brush chipper 10 be portable. The wheels 140 or other structures are supported on a sold surface 720 (see FIG. 7) such as the ground, a road, a concrete slab, etc.

Generally, the brush chipper 10 has an infeed end 150 and an outfeed end 160. A feed direction is defined, for the purposes of this document, including the claims, as the direction the material 710 is forced while it is being chipped; that is, the feed direction is the direction going from the infeed end 150 to the outfeed end 160 of the brush chipper 10.

A feed roller assembly 200 is illustrated in FIG. 2. The feed roller assembly 200 comprises the feed roller 100, a plurality of spiral cleats 210, a drive 220, which may be a hydraulic or electric motor, or a belt or chain drive, etc. The nature of the drive 220 of the feed roller 100 is immaterial to the present invention. Each roller 100 is attached to a shaft of the drive 220 by a nut 250. Additionally, the feed roller assembly 200 comprises a feed roller bracket 230 providing a mount for the drive 220, and attachments 240 for springs 310 shown in FIG. 3.

In FIG. 3, a tensioning system is shown which provides the forces required to maintain contact and friction on the wood or brush 710 being conveyed by the feed rollers 100. Each of the feed roller brackets 230 is slidably engaged in a guide 320. The feed roller brackets 230 are captive between the guide 320 and retainers 330. The guide 320 permits motion of the feed rollers 100 parallel to a line drawn between and normal to the feed rollers' axes of rotation 340. The springs 310 cause the feed rollers 100 toward one another, thereby gripping wood and brush 710 sufficiently to cause it to feed continuously, yet also permitting the feed rollers 100 to slip if a feed rate is too great, or if the material is jammed.

A view of the feed rollers 100 from below is shown in FIG. 4. The bottom of the infeed table 110 is seen to the right of the feed rollers 100, while a chipper drum 410 resides to the left of the feed rollers 100. Infeed rotational directions for each of the two feed rollers 100 are shown by arrows 420. Those of ordinary skill are well aware the indicated directions are required to feed material 710 into the cutter drum 410 or disk (not shown), and that these directions must be reversed to free material 710 from a jammed condition. The infeed rotational direction of the feed rollers 100 is hereby defined as shown in FIG. 4 to be the direction 420 of feed roller rotation providing force to the woody material 710 in the feed direction.

Figure 6:
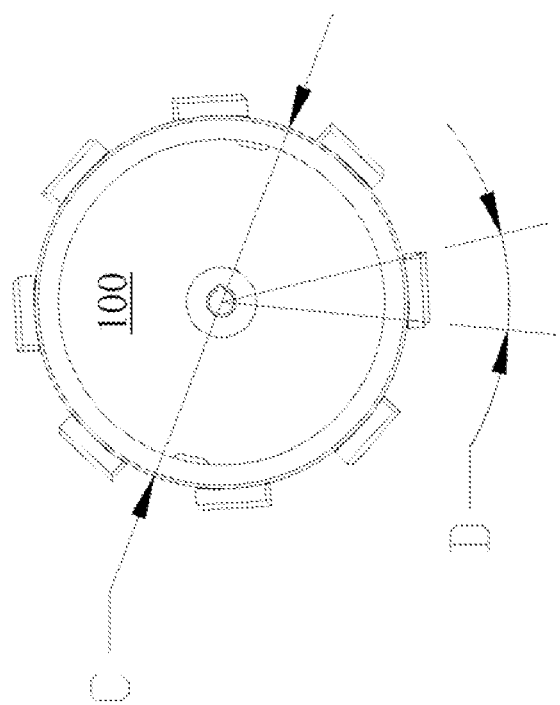
FIG. 6 is a plan view of the feed roller.
Figure 5:
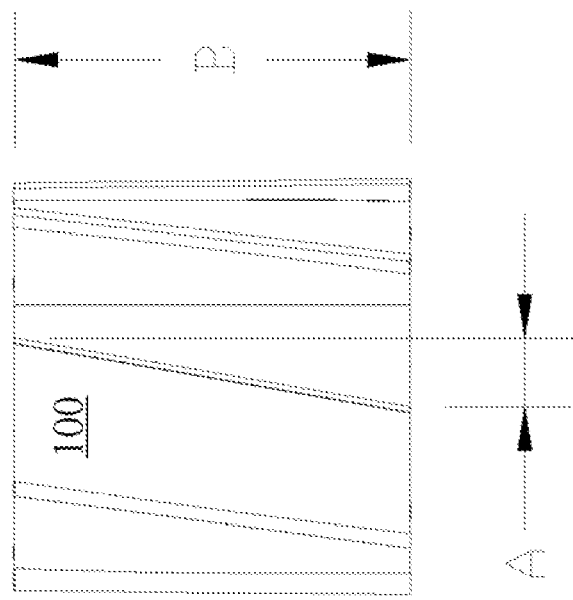
FIG. 5 is a side elevation view of the feed roller showing the orientation of cleats.

As the cleats 210 pass between the two feed rollers 100, the top of each cleat 210 leads the bottom of that cleat 210 by a distance, A, as shown in FIG. 5, or by an angle, D, as seen in FIG. 6. Appropriate values for the distance A and the angle D are obtained as functions of a feed roller height, B, a feed roller diameter, C, a feed roller rotational speed, and the expected material 710 to be chipped.

The log 710 of FIG. 7 is shown being fed into the brush chipper 10. The rear portion of the log 710, due to its weight and bearing on the feed table 110, is lower than the forward portion of the log 710, in the vicinity of the feed rollers 100. In FIG. 8, the log 710 has been straightened out by virtue of the spiral cleats' 210 force applied to the log 710 in a downward direction.

In FIGS. 9 and 10, an alternative embodiment is contrasted with the previously described embodiment. In FIG. 9, the first embodiment of the feed rollers 100 with spiral cleats 210 is shown. In FIG. 10, a second embodiment of the feed rollers 1000 is shown wherein the cleats 1010 are substantially parallel to the axis of rotation 1020 of their respective feed roller 1000. The axes of rotation 1020, however, are not vertical but angled at an angle θ as shown with the upper portion of the axes 1020 nearer the outfeed end of the brush chipper 10 than the lower portion of the axes 1020. With the axes of rotation 1020 angled in this manner, the woody material 710 is forced downward in the vicinity of the cutter 410.

Figure 11:
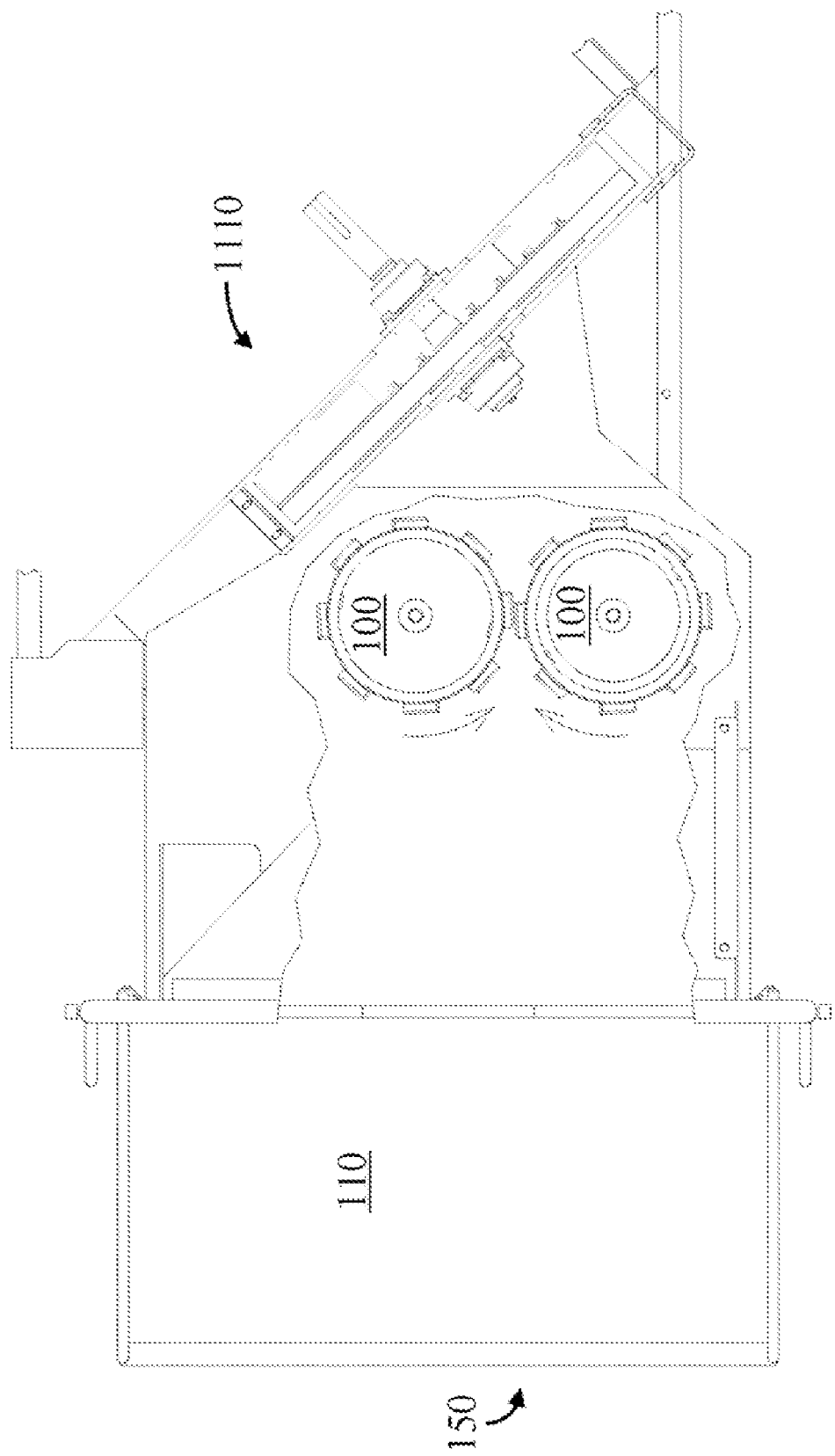
FIG. 11 is a plan view of parts of the brush chipper having a disk-type chipper or cutter.

In FIG. 11, the first embodiment of the present invention is shown on a brush chipper 10 having a disk-type cutter assembly 1110. The present invention, in any of its embodiments, is not limited to a particular style of cutter 410, 1110.

Although two feed rollers 100 are typical for brush chippers, a single feed roller 100 may be used by itself.

The above embodiments are the preferred embodiments, but this invention is not limited thereto. It is, therefore, apparent that many modifications and variations of the present invention are possible in light of the above teachings. It is, therefore, to be understood that within the scope of the appended claims, the invention may be practiced otherwise than as specifically described.

I claim:

1. A method of improving a feed of woody material into a brush chipper with a feed table and a cutter head, said brush chipper comprising at least two feed rollers, the at least two feed rollers comprising respectively a first and a second axis of rotation and a plurality of cleats on each feed roller, each cleat having an upper end and a lower end, the method comprising:
    (a) orienting the axes of rotation of both feed rollers to be substantially vertical when the brush chipper is supported on a level surface;
    (b) orienting the plurality of cleats such that each of the plurality of cleats is not parallel to the axes of rotation of the feed rollers;
    (c) orienting an upper end of each respective cleat ahead, in an infeed direction of rotation of the feed rollers, of a lower end of each respective cleat;
    (d) rotating the two feed rollers in opposite directions; and
    (e) placing brush on the feed table between the feed rollers so that the cleats move the brush forwardly toward the cutter head and downwardly toward the feed table as the at least two feed rollers rotate in the infeed direction.

2. The method of claim 1 wherein each of the cleats spans a finite angle about the respective feed roller, the method additionally comprising spanning less than 180° about the respective feed roller from the first end of each of the cleats to the second end of each of the cleats.

3. A brush chipper comprising:
    a frame;
    a feed table operatively attached to the frame;
    a cutter head operatively attached to the frame;
    at least two feed rollers operatively attached to the frame, the at least two feed rollers having respectively a first and a second axis of rotation, the axes of rotation of both feed rollers which are substantially vertical when the brush chipper is supported on a substantially level surface, the two feed rollers being disposed for rotation in opposite directions in an infeed mode;
    a plurality of cleats on each feed roller, each cleat having an upper end and a lower end, the plurality of cleats being disposed such that each of the plurality of cleats is not parallel to the axes of rotation of the feed rollers, an upper end of each respective cleat being disposed ahead, in an infeed direction of rotation of the feed rollers, of a lower end of each respective cleat, whereby when placing brush on the feed table between the feed rollers when the feed rollers are rotating will permit the cleats to move the brush forwardly toward the cutter head and downwardly toward the feed table as the at least two feed rollers rotate in the infeed direction.

4. The apparatus of claim 3 wherein each cleat spans a finite angle about the feed roller, each cleat spanning less than 180° about the feed roller from the first end of each respective cleat to the second end of each respective cleat.

5. The apparatus of claim 3 wherein each cleat on each respective feed roller is parallel to every other cleat on each respective feed roller and wherein the cleats on one of the at least two feed rollers are not parallel to the cleats on the other one of the at least two feed rollers.

* * * * *